US012800402B2

(12) United States Patent
Wild et al.

(10) Patent No.: US 12,800,402 B2
(45) Date of Patent: Nov. 17, 2026

(54) METHOD FOR HANDLING FOODS

(71) Applicant: Welbilt Deutschland GmbH, Eglfing (DE)

(72) Inventors: Hannes Wild, Riegsee (DE); Sebastian Siebert, Neubeuern (DE)

(73) Assignee: Welbilt Deutschland GmbH, Eglfing (DE)

( * ) Notice: Subject to any disclaimer, the term of this patent is extended or adjusted under 35 U.S.C. 154(b) by 309 days.

(21) Appl. No.: 18/623,403

(22) Filed: Apr. 1, 2024

(65) Prior Publication Data

US 2024/0337539 A1 Oct. 10, 2024

(30) Foreign Application Priority Data

Apr. 4, 2023 (DE) ......................... 102023108548.4

(51) Int. Cl.

*G01K 1/024* (2021.01)
*F24C 7/08* (2006.01)
*G01K 1/02* (2021.01)

(52) U.S. Cl.

CPC .............. *G01K 1/024* (2013.01); *F24C 7/082* (2013.01); *F24C 7/085* (2013.01); *G01K 1/026* (2013.01);

(Continued)

(58) Field of Classification Search

CPC .... G01K 1/024; G01K 1/026; G01K 2207/06; G01K 2207/08; G01K 2215/00; F24C 7/082; F24C 7/085

See application file for complete search history.

(56) References Cited

U.S. PATENT DOCUMENTS 6,817,757 B1 * 11/2004 Wallace ................. G01K 1/024 374/E1.004
10,670,470 B2 * 6/2020 Nivala ................... G01K 1/024

(Continued)

FOREIGN PATENT DOCUMENTS

CN 218355832 U 1/2023
DE 10114617 A1 9/2002

(Continued)

OTHER PUBLICATIONS

European Search Report, European Patent Application No. 25170284, filed Jul. 16, 2025, 1 pg.

(Continued)

*Primary Examiner* — Nathaniel T Woodward
*Assistant Examiner* — Philip L Cotey
(74) *Attorney, Agent, or Firm* — LOZA & LOZA, LLP; David S. Sarisky

(57) ABSTRACT

A method for handling foods includes providing a plurality of thermometers, each having an identifier, at least one core temperature sensor and one external temperature sensor, providing food in which one of the thermometers is inserted, wherein the core temperature sensor of the inserted thermometer is arranged to be further inside the food than the external temperature sensor, continuously measuring an external temperature using the external temperature sensor, continuously wirelessly transmitting the external temperature together with the identifier of the relevant thermometer to a control unit, transferring the food with the inserted thermometer from a first receiving space having a first receiving space temperature into a second receiving space having a second receiving space temperature assigning, by means of the control unit, which of the plurality of thermometers has been transferred together with the food on the (Continued)

basis of the measured external temperature of the plurality of thermometers.

15 Claims, 4 Drawing Sheets

(52) U.S. Cl.
CPC ..... *G01K 2207/06* (2013.01); *G01K 2207/08* (2013.01); *G01K 2215/00* (2013.01)

(56) References Cited

U.S. PATENT DOCUMENTS

| | | | | |
|---|---|---|---|---|
| 11,920,984 | B2 * | 3/2024 | Lion | G01K 1/024 |
| 2003/0007544 | A1 * | 1/2003 | Chang | F24C 7/08<br>374/149 |
| 2008/0043809 | A1 * | 2/2008 | Herbert | G01K 1/026<br>374/E1.005 |
| 2009/0188396 | A1 * | 7/2009 | Hofmann | H05B 6/6452<br>99/421 H |
| 2019/0339133 | A1 * | 11/2019 | Pulvermacher | A47J 37/0786 |
| 2022/0049992 | A1 * | 2/2022 | Nivala | G01K 1/024 |
| 2024/0060828 | A1 * | 2/2024 | Bhogal | G01K 1/024 |

FOREIGN PATENT DOCUMENTS

| | | | |
|---|---|---|---|
| DE | 102007018245 | A1 | 10/2008 |
| DE | 102012112850 | A1 | 6/2014 |
| EP | 1788369 | A1 | 5/2007 |

OTHER PUBLICATIONS

European Search Report, European Patent Application No. 24168090.9, Sep. 2, 2024.

German Search Report, German Patent Application No. 102023108548.4, Nov. 15, 2023, 2 pgs.

* cited by examiner

METHOD FOR HANDLING FOODS

CROSS-REFERENCE TO RELATED APPLICATION

This application claims priority to German Patent Application No. DE102023108548.4, entitled “Methods for Handling Foods” and filed on Apr. 4, 2023, which is expressly incorporated by reference herein in its entirety.

BACKGROUND

The present invention relates to a method for handling foods using a thermometer for the core temperature measurement. Furthermore, the invention discloses a corresponding assembly for handling foods, preferably configured to carry out the method.

In kitchens, in particular professional kitchens, a plurality of thermometers are often provided for measuring the core temperature of the foods. In this case, thermometers can be used which are not connected to the relevant cooking appliance by a cable, but send the core temperature to the cooking appliance wirelessly. In order to differentiate a plurality of thermometers from one another, they are marked with letters or numbers, for example. When the thermometer is used, it is inserted into the food and the food together with the inserted thermometer is inserted into the cooking appliance. Here, the user has to select on the cooking appliance what thermometer they have used so that the cooking appliance displays or monitors the core temperature from this exact thermometer. This process is associated with corresponding complexity and is prone to errors, since the wrong thermometer can be selected by the operator, for example.

SUMMARY

The object of the present invention is to specify a method for handling foods that can be carried out in a user-friendly and safe manner.

This object is achieved by the features of the independent claims. The dependent claims relate to preferred developments of the invention.

The object is thus achieved by means of a method for handling foods that comprises at least the following steps.

A plurality of thermometers are first provided. The individual thermometer is in particular an object that can be inserted into a food. For this purpose, the individual thermometer for example comprises a handle, from which a rod extends to a tip. The thermometer comprises at least one core temperature sensor and one external temperature sensor. The two sensors are arranged within the relevant thermometer such that, when the thermometer is inserted into a food, the at least one core temperature sensor is further inside the food than the external temperature sensor. As explained in the following, the external temperature sensor is supposed to reach and measure the temperature of a “receiving space” for the food as rapidly as possible. Therefore, it is in particular provided that the external temperature sensor is arranged such that it is located outside the food in the inserted state of the thermometer, for which purpose this sensor is preferably arranged in the handle of the thermometer. However, the external temperature sensor can also be arranged slightly inside the food and, in this case, detects the temperature of the receiving space relatively rapidly.

Each thermometer preferably comprises a specific identifier. This identifier is stored in an electronic unit of the thermometer.

Furthermore, at least one food in which one of the thermometers is inserted is provided. This one thermometer is referred to in the following as the “inserted thermometer”. As described, the core temperature sensor of the inserted thermometer is arranged to be further inside the food than the external temperature sensor. In particular, the external temperature sensor is located outside the food.

An external temperature is also continuously measured using the external temperature sensor of the plurality of thermometers. As described later, the core temperature is preferably also continuously measured using the core temperature sensor. Furthermore, the external temperature, preferably also the core temperature, together with the identifier of the relevant thermometer is continuously wirelessly transmitted to a control unit.

The term “continuously” in conjunction with measuring the temperatures and the wireless transmission describes that this process is not performed once, but multiple times. In particular, it is provided that the thermometers measure and wirelessly transmit the temperatures at regular intervals (for example milliseconds or seconds). Having said that, the term “continuously” does not exclude this measurement and/or transmission by individual thermometers or all the thermometers also being able to be interrupted. For example, the thermometers can be located in a charging station, and they do not measure or transmit here, since it is already known that the thermometer that is currently charging is not in use. It is also possible, for example, that the thermometers pass into an idle state and do not measure and/or transmit in this state. The thermometers preferably comprise an internal memory, in which the measured temperature values can be stored, for example. This internal memory is in particular used when the wireless link to a receiving module is interrupted. The wireless transmission of the data can be continued once a link to the receiving module can be re-established.

Furthermore, it is preferably provided that the thermometer only begins to transmit when it ascertains a difference between its core temperature and its external temperature. Specifically, it should be assumed in most applications that, when the thermometer is inserted into the food, a difference between the measured core temperature and the measured external temperature ensues relatively rapidly and this makes it possible to ascertain that the thermometer is being used. This behavior can increase the battery life of the thermometers.

As described, the measured temperatures together with the identifier are “wirelessly” transmitted to a control unit. Near-field communication, such as Bluetooth, is in particular provided for this wireless transmission.

The control unit can comprise one module or a plurality of modules positioned at different locations. As described in greater detail as part of the assembly according to the invention, the control unit in particular comprises at least one receiving module; the thermometers send temperatures to this receiving module.

As part of the method according to the invention, the food is also “transferred” together with the inserted thermometer from a first receiving space into a second receiving space. The “receiving space” can be a “room” in a building, for example a kitchen or a stockroom, a cold store or a walk-in freezer. Furthermore, the receiving space can be formed by an appliance; appliances of this type are referred to as food-receiving appliances in the present case. A food-receiving appliance of this kind is, for example, a cooking appliance, in particular a combi-steamer, a warming appliance, a blast chiller, a blast freezer, a refrigerator or a freezer. It is provided here that the food-receiving appliance forms a receiving space, into which a food can be transferred.

In the following, the terms "first receiving space" and "second receiving space" are used. In this case, the first receiving space is always the receiving space in which the food having the inserted thermometer is first located and the second receiving space is the receiving space into which the food having the inserted thermometer is transferred. If, for example, a chicken having the inserted thermometer is inserted into a cooking appliance, this is a transfer from the first receiving space, the "kitchen", into the second receiving space, which can also be referred to as the "cooking chamber" of the cooking appliance.

The first receiving space has a first receiving space temperature. The second receiving space has a second receiving space temperature. These two receiving space temperatures differ from one another. If, therefore, the food having the inserted thermometer is transferred from the first receiving space to the second receiving space, the external temperature, which is measured using the external temperature sensor of the inserted thermometer, also changes relatively rapidly. This knowledge is utilized in the following to ascertain which of the plurality of thermometers is inserted in the food or which of the plurality of thermometers is being used.

Therefore, in the method according to the invention, the following step is carried out, referred to as "thermometer assignment": assigning which of the plurality of thermometers, as the "inserted thermometer", has been transferred together with the food. This assignment is made by means of the control unit and is based on the measured external temperature of the plurality of thermometers.

For the thermometer assignment, the control unit evaluates, in particular continuously, whether one of the external temperatures of the plurality of thermometers is changing. If, for example, the external temperature of a thermometer increases from room temperature (e.g. 21° C.) to above 80° C., and the external temperature of all the other thermometers remains substantially the same, the control unit can conclude that this one thermometer is now being used and is thus located in a food which has just been transferred into a cooking appliance.

A similar situation can arise under the following consideration: assuming that all the thermometers used in a kitchen are inserted in foods and are located in the receiving space of a cooking appliance. In this case, the thermometers each transmit external temperatures that are substantially above 80° C., for example, to the control unit. Once one of the foods having the inserted thermometer has been removed from the cooking appliance, the external temperature of the associated thermometer decreases, while the external temperature of all the other thermometers remains substantially the same. The control unit can thus ascertain which thermometer has been transferred together with the food; in this case, the cooking appliance forms the first receiving space and the kitchen constitutes the second receiving space.

In a preferred configuration, it is provided that not only is a thermometer assignment carried out, but also a receiving space assignment. In principle, this receiving space assignment can be carried out at the same time as the thermometer assignment, or after the thermometer assignment. In principle, two different variants are provided for the receiving space assignment, which, however, can also both be carried out in order to use one variant to improve or validate the result of the other variant:

(A) the first variant is referred to as the "first receiving space assignment". In this case, the receiving space into which the inserted thermometer together with the food has been transferred is assigned on the basis of the measured external temperature of the inserted thermometer. This assignment is also made by means of the control unit.

Once it has been assigned which thermometer is the "inserted thermometer", the change in the external temperature can be examined more closely by means of the control unit. If, for example, the external temperature increases to over 80° C., the control unit can assume that the food together with the inserted thermometer has been transferred into a cooking appliance. If there are a plurality of cooking appliances in the kitchen environment, the controller can for example also take into account which of the cooking appliances is active or which receiving space temperature is prevailing in which of the cooking appliances. On the other hand, the control unit can also ascertain that the external temperature of the inserted thermometer has dropped below 0° C., for example, meaning that the control unit can readily conclude that the thermometer together with the food has been transferred into the freezer.

It goes without saying that the first receiving space assignment can also be carried out at the same time as the thermometer assignment. If, for example, it is stored in the control unit that the receiving space of a first cooking appliance has been heated to 80° C. and the receiving space of a second cooking appliance has been heated to 200° C., when transferring the food together with the inserted thermometer into one of the two receiving spaces, it can be immediately detected that this exact thermometer is the "inserted thermometer" and it can be simultaneously detected into which of the two receiving spaces this food is transferred, namely by it being ascertained whether the external temperature increases to approximately 80° C. or to approximately 200° C.

(B) Additionally, or alternatively to the first receiving space assignment, a second variant, referred to as the "second receiving space assignment", can also be taken into account by means of the control unit. In this case, the receiving space into which the inserted thermometer together with the food has been transferred is assigned on the basis of at least one of the following points:

(i) The relevant receiving space can comprise a door. For example, a corresponding door is located on a cooking appliance to close the cooking chamber. However, doors which have to be opened in order to transfer food are also found on a refrigerator, a stockroom, a cold store, etc. As part of the method, it is preferably provided that an actuation of the relevant door is ascertained. This is done for example by means of a simple switch on the door. The control unit can ascertain this actuation of the door and use this information to assign the receiving space.

In the following example, it is explained how the first receiving space assignment can be combined with the second receiving space assignment. It is assumed that there are two cooking appliances in the kitchen environment, which have each been heated to the same temperature. Furthermore, there is a refrigerator. The actuation of the relevant door can be ascertained on all three appliances. If a food is then relatively rapidly transferred out of the refrigerator into one of the cooking appliances, this transfer from the refrigerator into one of the cooking appliances can be readily ascertained on the basis of the external temperature change in the inserted thermometer. Since the control unit ascertains that the door of only one of the two cooking appliances has been opened, it can be concluded with certainty into which cooking appliance the food having the inserted thermometer has been transferred. If the control unit were to only reference the external temperature, it could not readily determine into which cooking appliance this food has been transferred. If, on the other hand, the control unit were to only detect the actuation of the doors on the two cooking appliances and the refrigerator, the control unit could not readily determine, without taking in account the measured external temperature, whether the food has been transferred into the cooking appliance or the refrigerator. This example is supposed to demonstrate that, on the basis of the very different appliances that can be used in a kitchen environment, the first receiving space assignment or the second receiving space assignment or, however, a combination of both receiving space assignments can be applied.

ii) Furthermore, it is provided that, for the second receiving space assignment, the food and/or the inserted thermometer are detected by means of a camera in the transition region between the first receiving space and the second receiving space. This kind of camera, for example in the region of the door of a cooking appliance, can detect that a food has been transferred. In this case, the control unit can preferably also evaluate whether a thermometer is inserted in the detected food and/or what the food is.

iii) Furthermore, as part of the second receiving space assignment, it is preferably provided that the control unit evaluates the signal strength with which the thermometers transmit the data. In this process, it needs to be taken into account that a relative position between the receiving module and the respective receiving spaces can be stored in the control unit. If, for example, a receiving module is located directly on the appliance forming the receiving space, a relatively high signal strength compared with the signal strengths of other thermometers is a strong indication that the relevant thermometer has been transferred into precisely this receiving space or has been removed from this receiving space.

It is preferably provided that, as part of the method, more than two receiving spaces for the assignment of the inserted thermometer are available for selection. If there is just one food-receiving appliance (for example a cooking appliance) in a kitchen, the assignment of the receiving spaces is relatively simple, since there can only be one transfer, from the kitchen into the food-receiving appliance and back again. In particular if more than two receiving spaces are provided, for example two food-receiving appliances and the kitchen, the described receiving space assignment can be particularly advantageously applied. Particularly preferably, the method takes into account that at least three, particularly preferably at least four, receiving spaces for the assignment of the inserted thermometer are available for selection.

For the thermometer assignment and/or for the first receiving space assignment, it is preferably provided that the measured external temperature is compared with at least one external temperature reference value by means of the control unit. Additionally, or alternatively, it is possible for a rate of change of the measured external temperature of the relevant thermometer to be determined by means of the control unit and for this rate of change to be compared with at least one rate of change reference value.

At its simplest, there is just one reference value in each case, i.e. for example an external temperature reference value or a rate of change reference value. If the value exceeds or falls below this reference value, it can be concluded that this exact thermometer is the “inserted thermometer”. Preferably, however, a plurality of these reference values are used in the control unit; in this case, a plurality of external temperature reference values and/or a plurality of rate of change reference values can be applied. As a result, a significantly more accurate first receiving space assignment is possible in particular. Therefore, it is preferably provided that the at least one external temperature reference value and/or the at least one rate of change reference value are each assigned to a certain receiving space.

The relevant reference value, whether it is the external temperature reference value or the rate of change reference value, can be stored as a fixed value in the control unit in principle. If the relevant reference value is assigned to a refrigerator, a freezer, a blast chiller, a blast freezer, etc., for example, it may be sufficient for a fixed value to be stored for a receiving space of this kind, since the temperature of a receiving space of this kind generally changes only negligibly. For example, a freezer can always be set to −18° C.

Furthermore, however, it is also provided that the relevant reference value is adjusted by the control unit on the basis of the associated receiving space temperature. This receiving space temperature can be measured or determined in another way. For example, the receiving temperature of a cooking chamber can be measured and transmitted to the control unit. However, it may be sufficient for the set temperature (target temperature) of the receiving space to be transmitted to the control unit defined here. In both cases, the control unit can accordingly adjust the reference value on the basis of this information. If, for example, a cooking appliance is pre-heated to 80° C., the control unit can set the associated reference value to 70° C., for example. If an external temperature of at least 70° C. is determined at one of the thermometers, the control unit can conclude that this thermometer has been transferred into the associated receiving space together with a food.

If not only the measured external temperature but also the rate of change of the measured external temperature are taken into account, a very accurate and in particular rapid assignment can be carried out in certain situations. If, for example, a cooking appliance is pre-heated to 80° C. and another cooking appliance is pre-heated to 200° C., after a certain amount of time since the thermometer together with the food was transferred it can be established, on the basis of the external temperature, in which of the two cooking appliances the food together with the thermometer is located. In order to accelerate this process, however, the rate of change of the external temperature can be observed. If the food is transferred into the cooler cooking appliance (80° C.), the measured external temperature at the thermometer increases more slowly than if the food is transferred into the hotter cooking appliance (200° C.). As a result, even before the final external temperature on the thermometer is reached, it can be ascertained into which of the two cooking appliances the food has been transferred.

It is also preferably taken into account that the thermometer assignment and/or the receiving space assignment (first receiving space assignment and/or second receiving space assignment) is/are only started when at least one of the following start conditions is satisfied. As a result, unnecessary computing time in the control unit can be saved and incorrect assignments can be avoided:

(i) Ascertaining an actuation of a door on one of the receiving spaces. In this case, it is taken into account that it is extremely unlikely that a food is transferred when a door on one of the receiving spaces has not been actuated at all.

(ii) Detecting the food and/or the inserted thermometer by means of a camera in the transition region between the first receiving space and the second receiving space. This start condition makes sense in particular when a camera is used at all the transitions between the receiving spaces in the relevant kitchen environment. Therefore, the assignment can be started only when a transfer of a food is ascertained at one of the transitions.

(iii) Ascertaining a temperature difference between the core temperature measured by the core temperature sensor and the external temperature at one of the thermometers. This can be ascertained both within the thermometers and within the control unit. For example, the thermometer itself can ascertain whether there is a temperature difference of this kind and then send a corresponding message to the control unit that the assignment can then be started. However, the control unit can also ascertain a temperature difference of this kind between the external temperature and the core temperature of the individual thermometer and can then start the assignment. It is assumed that a thermometer that is not inserted in the food measures approximately the same core temperature and external temperature. Once the thermometer has been inserted, a temperature difference arises between the core temperature and the external temperature, since the food is generally cooled and is generally located in the kitchen environment before being transferred into another receiving space, meaning that approximately the temperature of the kitchen is measured as the external temperature and the significantly lower temperature of the cooled food is measured as the core temperature.

(iv) Furthermore, it is possible for the assignment to only start when the user makes a user input. This user input can be made at any human-machine interface (HMI) which is in a data connection to the control unit. For example, the HMI can be arranged on the food-receiving appliance that forms the second receiving space. If, for example, the food is transferred into a cooking appliance, the HMI of the cooking appliance, i.e. the touch display on the cooking appliance, for example, can be used for this user input.

Furthermore, it is preferably provided that the thermometer assignment is displayed to a user. In this case, the user preferably has the option of confirming and/or modifying the thermometer assignment. For this purpose, it is in particular provided that the relevant thermometer also comprises a visible, individual marking (for example a number, letter or color code) in addition to the above-described identifier, which is electronically transmitted. It can thus be displayed to the user that a certain thermometer has been assigned, for example the "red" thermometer. The user can then preferably confirm and/or modify this.

In a similar way, it is preferably provided that the receiving space assignment is also displayed to a user, and can preferably be confirmed and/or modified by the user.

As already described, it is preferably provided that the core temperature is continuously measured by means of the core temperature sensor of the inserted thermometer and the core temperature together with the identifier is continuously wirelessly transmitted to the control unit.

This in particular allows for the following configurations of the method:

(i) Preferably, the core temperature and the associated receiving space are displayed. This display of the associated receiving space is particularly beneficial if this information is not displayed directly on the receiving space, for example on the cooking appliance, but instead on a non-appliance-bound HMI, for example a smartphone or a tablet.

(ii) Furthermore, it is preferably provided that the core temperature is displayed on a display, in particular an HMI of the food-receiving appliance, that forms the second receiving space. In this case, the assigned receiving space does not necessarily have to be displayed, since it is clear to the user anyway that this exact receiving space at which the core temperature is displayed has been assigned as the correct receiving space.

(iii) Furthermore, it is preferably provided that the temperature of the first receiving space and/or the second receiving space is controlled on the basis of the core temperature. Here, the "first receiving space" is the receiving space from which the food is removed. If, for example, it is ascertained that the food together with the inserted thermometer has been removed from a cooking chamber, the temperature of this cooking chamber can be automatically reduced. In most applications, however, the temperature of the second receiving space, namely the receiving space into which the food has been transferred, is controlled on the basis of the core temperature. For example, on the basis of the core temperature, the temperature of the cooking appliance can be reduced as the target core temperature gets closer to being reached.

(iv) Furthermore, it is preferably provided that a dwell time of the food in the second receiving space is determined, and preferably displayed, on the basis of the core temperature. For instance, monitoring can be performed to ensure that the food does not remain in the second receiving space for too long, and in particular the end of the dwell time is displayed when the core temperature is reached.

(v) It is also preferably provided that a warning is output on the basis of the core temperature if the food is transferred at a core temperature that is too low. For instance, monitoring can be performed for example to ensure that a food (for example fish or poultry) is not removed from the cooking appliance at a core temperature that is too low.

It is preferably provided that the timing of the thermometer assignment and/or the receiving space assignment (first receiving space assignment and/or second receiving space assignment), in particular also the measured temperatures, is logged in the control unit for monitoring the quality of the food. By monitoring quality in this way and logging the measured values and assignments, the cold chain for the food having the inserted thermometer can be monitored. In this case, it is preferably provided that this logging is carried out across a plurality of transfers, in particular across at least two or at least three transfers. For example, this logging is carried out while the food having the inserted thermometer is located in a cold store, is transferred from this cold store to the kitchen, and is transferred from the kitchen to the cooking appliance. This logging can assist in adhering to HACCP guidelines and EN food safety standards.

The invention further relates to an assembly for handling foods. This assembly is preferably configured to carry out the method that has been described above. It is in particular provided that the above-described configurations of the method and the associated dependent claims for the method constitute advantageous configurations of the assembly according to the invention.

The assembly according to the invention comprises a plurality of thermometers. As described, each thermometer comprises an identifier specific to the thermometer, at least one core temperature sensor and one external temperature sensor.

In addition to the thermometers, the assembly comprises the control unit. As already described, the control unit is configured to carry out the assignment of which thermometer has been transferred as the "inserted thermometer" together with a food. This assignment is carried out on the basis of the measured external temperature of the thermometers and when the food is transferred together with the inserted thermometer from a first receiving space into a second receiving space. As already described, these two receiving spaces differ in their receiving space temperatures.

Reference is made to the method already described in particular for the assignment of the thermometer and for the assignment of the receiving space. The control unit of the defined assembly is preferably configured to carry out these assignments, as described as part of the method.

The control unit can comprise at least one receiving module. The thermometers and the receiving module are configured for wireless data transmission. In this case, at least unidirectional data transmission takes place, namely from the thermometers to the receiving module. Near-field communication, for example Bluetooth, is in particular provided for the data transmission between the thermometers and the receiving module. The control unit preferably comprises a plurality of receiving modules, which can be arranged in different positions.

At least one of the receiving modules is preferably located in a food-receiving appliance. In this case, the receiving module can be completely or partially arranged inside the food-receiving appliance or on the outside of the food-receiving appliance.

Furthermore, the control unit can comprise a computing module. The computing module is configured to carry out the described assignments. The computing module can be split up in space. For instance, one part of the computing module can be located in the kitchen environment, in particular in one of the food-receiving appliances, and another part of the computing module can be located in a server or a cloud. In this case, the different parts of the computing module are interconnected over a corresponding network, in particular the internet. However, it is also possible for the entire computing module to be arranged locally, in particular integrated in one of the food-receiving appliances.

It is in particular provided that the plurality of receiving modules, preferably all the receiving modules, are interconnected directly and/or over a network such that the thermometers can transmit to any receiving module, in particular the closest receiving module. For instance, a receiving module can in particular receive the data from the thermometer at any point, for example in any food-receiving appliance, in the form of a "range extender" or "repeater", and can forward them to the computing module directly and/or over a network. In this case, this computing module can be located in another food-receiving appliance or at any point.

The repeater function facilitates the following, for example: if the thermometer is located in a refrigerator that is not connected to the network, for example, the thermometer can still feed its data into the network via another appliance in the vicinity, e.g. via a steamer comprising a receiving module.

The "repeater function" in particular provides the option of displaying real-time monitoring (live). For example, any number of appliances can be incorporated in the kitchen environment and thus the processes or the temperatures sent by the thermometers can be seamlessly monitored. If there is a deviation from a required process sequence or temperature (e.g. products stored for too long, incorrect core temperature, door of the cold store is open and the temperature is increasing, etc.), a warning can be displayed on the appliances. A separate monitor can be incorporated in the kitchen which is installed for monitoring and displaying the process sequences. Alternatively, a notification message can be output to a mobile terminal device, such as a head chef's mobile phone.

The control unit can also comprise at least one human-machine interface, also referred to as an HMI. This HMI can be integrated in the food-receiving appliance, for example. For example, a cooking appliance comprises an HMI (e.g. touch display) anyway, which can also be used for the control unit and thus for the described method.

Furthermore, however, a portable terminal device, such as a smartphone or a tablet, or another operating unit, can also form this human-machine interface of the control unit. For example, the portable terminal device can be connected to the computing module over any network (internet and/or WLAN).

Furthermore, it is preferably provided that the control unit comprises at least one food-receiving appliance. The control unit preferably comprises a plurality of food-receiving appliances. Each of these food-receiving appliances forms a receiving space, as has already been defined as part of the method according to the invention. The individual food-receiving appliance is preferably configured as: a cooking appliance, a warming appliance, a blast chiller, a blast freezer, a refrigerator, a freezer, a cold store, a stockroom or a walk-in freezer.

It is preferably provided that the control unit comprises at least two receiving modules, with one of the receiving modules being arranged to receive inside one of the food-receiving appliances and the other receiving module being arranged to receive outside this food-receiving appliance. In this case, it is in particular taken into account that the door on the food-receiving appliance can relatively severely impair the receiving between the receiving module and the thermometer. Therefore, depending on the configuration of the food-receiving appliances, at least one receiving module should be located both in the receiving space and outside the receiving space.

The invention further relates to a food-receiving appliance, preferably the above-described food-receiving appliance. In particular, the food-receiving appliance is configured to heat or cool foods. The food-receiving appliance is, for example, a cooking appliance, in particular a combi-steamer, a warming appliance, a blast chiller, a blast freezer, a refrigerator or a freezer. The food-receiving appliance comprises an integrated receptacle for inserting at least one thermometer, wherein the receptacle is configured to charge a power storage unit of the at least one thermometer. The receptacle is preferably configured for inserting a plurality of thermometers, in particular at least two or at least three thermometers.

The receptacle is preferably configured for inserting wirelessly transmitting thermometers having core temperature sensors.

The receptacle is preferably configured for wireless charging of the at least one thermometer. Alternatively, the receptacle can also comprise electrically conducting contacts, by means of which it is possible to transmit power to the at least one thermometer.

The food-receiving appliance preferably comprises a power supply assembly comprising at least one power supply. The power supply assembly supplies power to at least one device of the food-receiving appliance, which is used to heat or cool the food. The receptacle is also preferably connected to the power supply assembly in order to be supplied with the required power for charging the thermometer(s).

The food-receiving appliance preferably comprises a cover, in particular configured as a pivotable flap, wherein the receptacle is arranged on the inside of the cover. The cover preferably covers a space in the housing of the food-receiving appliance.

BRIEF DESCRIPTION OF THE DRAWINGS

Further details, advantages and features of the present invention will become clear from the following description of an exemplary embodiment with reference to the drawings, in which.

DETAILED DESCRIPTION

In the following, an assembly 1 for carrying out the method according to the invention is described in detail on the basis of FIGS. 1 to 5.

Figure 1:
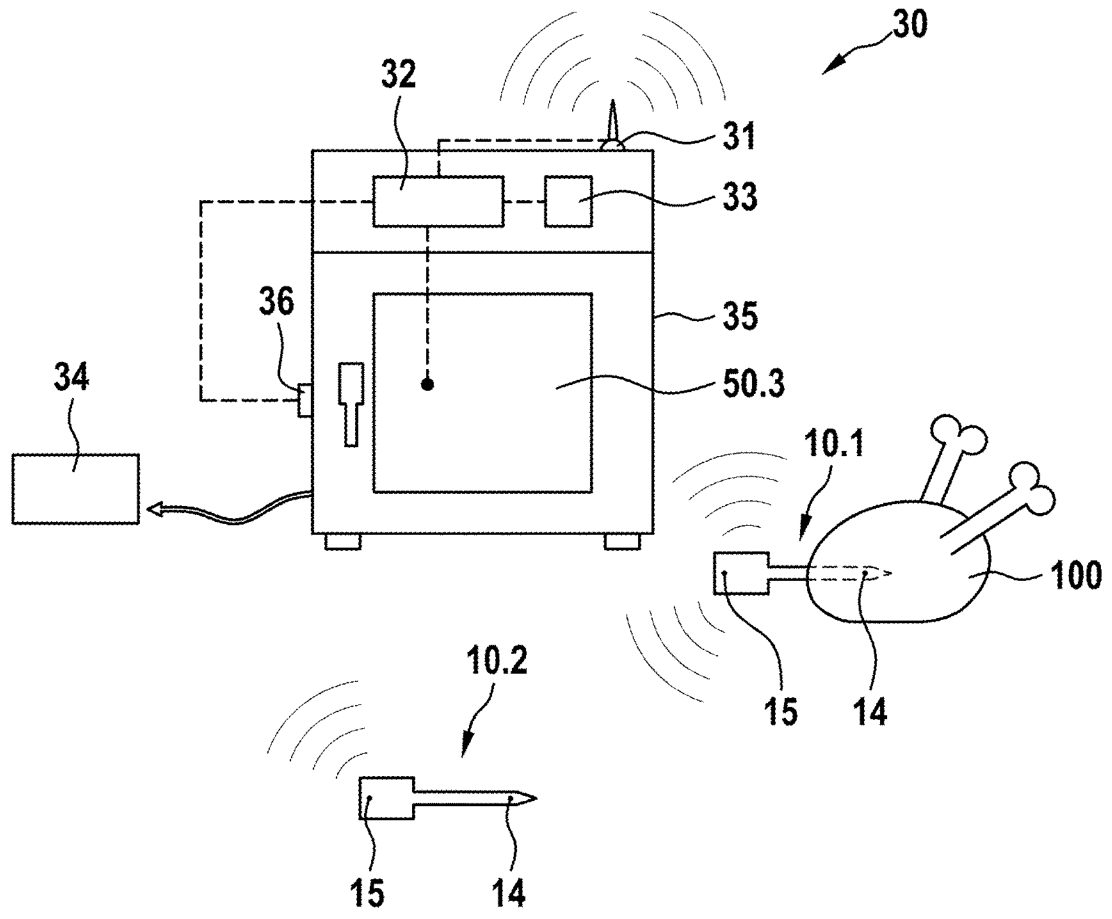
FIG. 1 is a first view of the assembly according to the invention for carrying out the method according to the invention in accordance with an exemplary embodiment.
Figure 2:
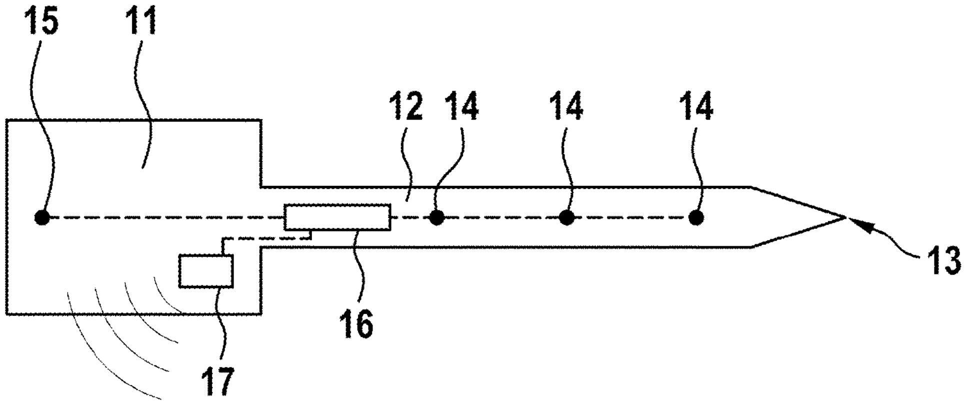
FIG. 2 is a detailed view of a thermometer of the assembly according to the invention for carrying out the method according to the invention in accordance with the exemplary embodiment.
Figure 3:
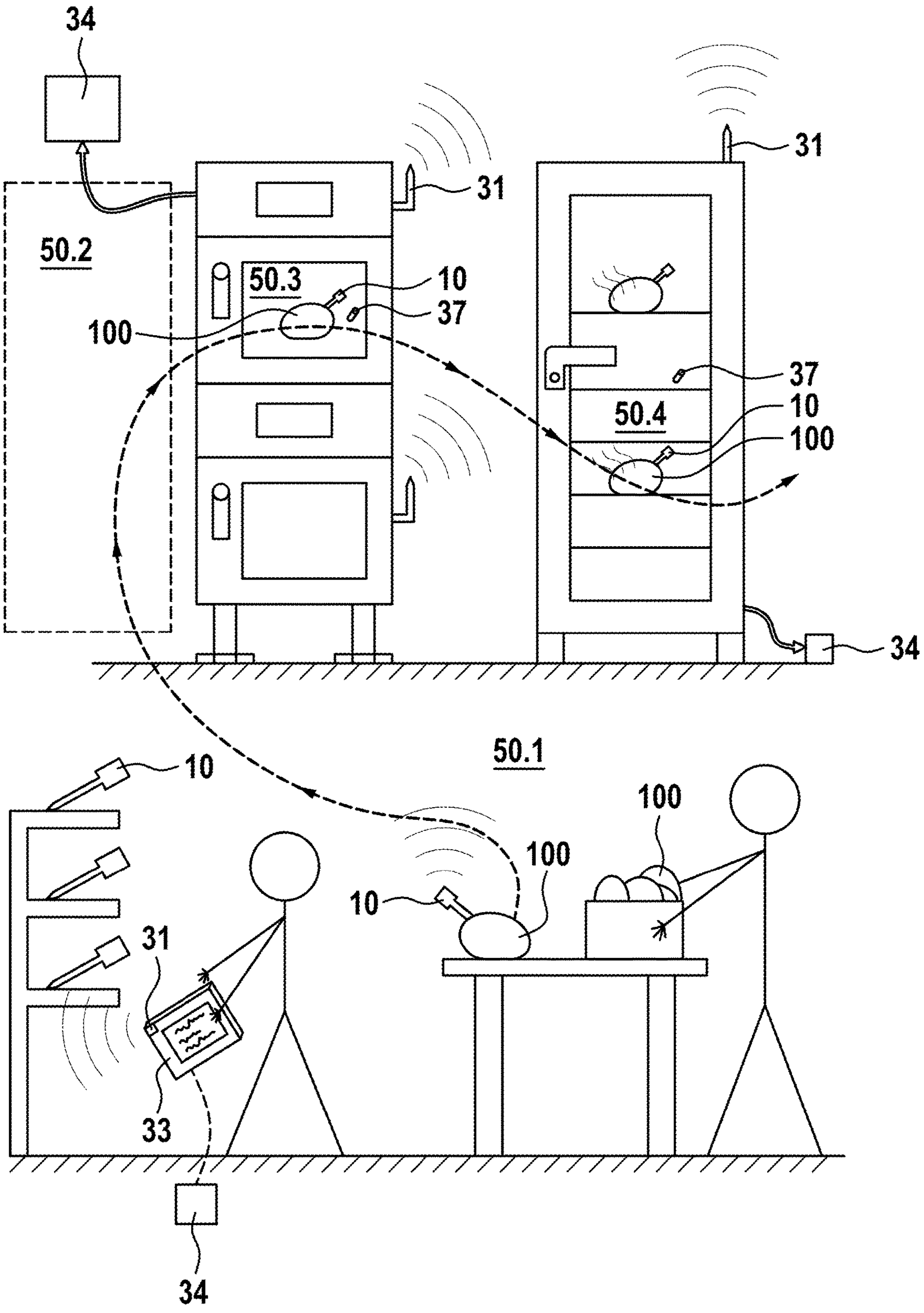
FIG. 3 is another schematic view of the assembly according to the invention for carrying out the method according to the invention in accordance with the exemplary embodiment.

FIGS. 1 to 3 show that the assembly 1 comprises a plurality of thermometers 10. Each thermometer 10, as shown in particular in FIG. 2, comprises a handle 11, from which a rod 12, in particular made of metal, extends. The rod 12 ends in a tip 13. With this tip 13 at the front, the thermometer 10 is inserted into a corresponding food 100.

The thermometer 10 comprises at least one core temperature sensor 14. In the exemplary embodiment shown, a plurality of these core temperature sensors 14 can also be provided.

The thermometer 10 also comprises an external temperature sensor 15, in particular in the region of the handle 11.

An electronic unit 16, which is preferably connected to a battery (not shown), is located inside the thermometer 10. The electronic unit 16 is connected to a sending unit 17. The electronic unit 16 and the sending unit 17 are configured to wirelessly send the measured temperatures from the core temperature sensors 14 and the external temperature sensor 15. The thermometer 10 can comprise an internal memory, in which the measured temperature values can be stored, for example. This internal memory is in particular used when the wireless link to the receiving module 31 is interrupted. The wireless transmission of the data can be continued once a link to the receiving module 31 can be re-established.

FIGS. 1 and 3 in particular also show that the assembly 1 comprises a control unit 30. This control unit 30 can comprise a plurality of receiving modules 31. The receiving modules 31 receive the data sent by the sending unit 17 of the thermometers 10.

A specific identifier, for example a number, is stored in the electronics unit 16 of the relevant thermometer 10. The sending unit 17 sends the measured temperatures together with this identifier.

The control unit 30 also comprises a computing module 32. In the exemplary embodiment shown, the computing module 32 is located in one of the food-receiving appliances 35. However, the schematic view in FIGS. 1 and 3 also shows a link to a server 34. The server 34 can also be referred to as the cloud. The link to the server 34 is made over a network, for example the internet. This makes it possible to completely or partially relocate the computing module 32 to this server 34 (cloud).

The control unit 30 comprises a plurality of food-receiving appliances 35, for example a cooking appliance as shown in FIGS. 1 and 3 or a warming appliance as shown in FIG. 3. Other examples of food-receiving appliances 35 are explained in the general part of the description.

FIG. 1 purely schematically shows that the food-receiving appliance 35 can comprise a door switch 36. A door switch 36 of this kind can detect whether the door of the relevant food-receiving appliance 35 has been actuated.

Furthermore, the control unit 30 can comprise receiving space temperature sensors 37, which measure the temperature in the relevant receiving space 50.

FIGS. 1 and 3 show different examples of receiving spaces 50: For example, the lower half in FIG. 3 shows a cold store 50.1 as a receiving space. In the upper half of FIG. 3, a kitchen 50.2 is purely schematically shown as the receiving space. A first food-receiving appliance 35 in the form of a cooking appliance is located in this kitchen 50.2. This cooking appliance forms a cooking chamber 50.3 as the receiving space. Another food-receiving appliance 35 in the form of a warming appliance is located to the right beside the cooking appliance. This warming appliance forms a warming chamber 50.4, which likewise constitutes a receiving space.

As schematically shown, the control unit 30 can comprises a human-machine interface 33 (HMI). For example, a touch display that is provided in the food-receiving appliance 35 anyway can be used as an HMI 33 of this kind, as shown in FIG. 1. Furthermore, FIG. 3 shows, purely by way of example, that a portable terminal device, for example a tablet or a smartphone, can also be used as the HMI 33. Here, FIG. 3 shows that the HMI 33 can be connected to the server 34 and thus to the computing module 32 over a wireless network. It is also schematically shown that a receiving module 31 can also be integrated in this HMI 33.

Figure 4:
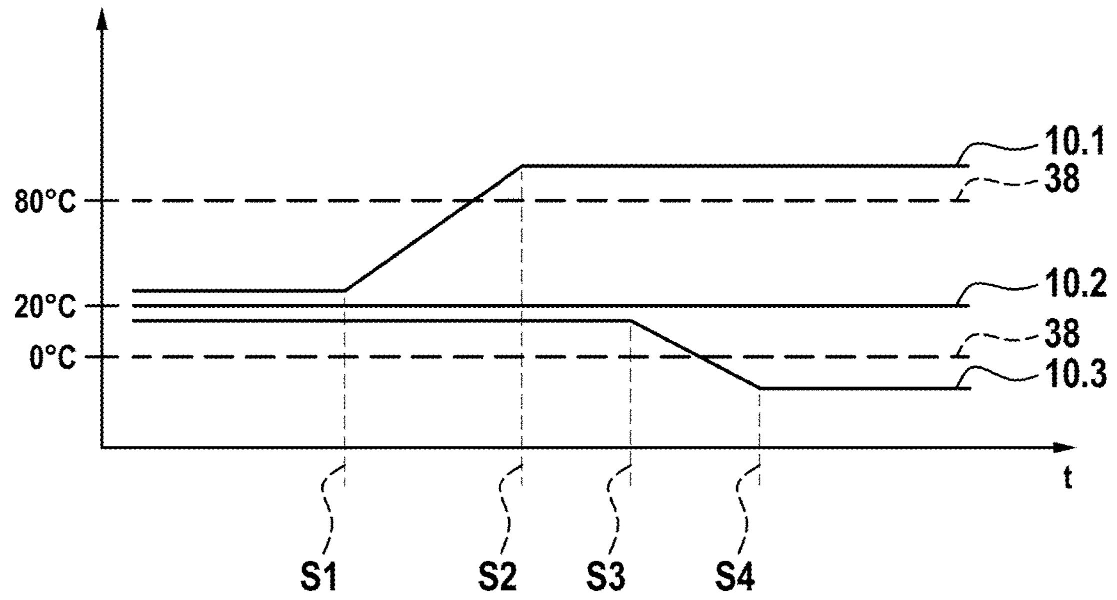
FIGS. 4 and 5 show two schematic examples for carrying out the assignment as part of the method according to the invention in accordance with the exemplary embodiment.

As explained in the general part of the description, the foods 100 having the inserted thermometer 10 can be transferred between these receiving spaces 50. For the description of this transfer and the assignments, reference is made to the general part of the description, which is explicitly also part of this exemplary embodiment. In the following, a thermometer assignment and a receiving space assignment are described purely by way of example on the basis of FIGS. 4 and 5:

FIG. 4 shows, purely schematically and in a highly simplified manner, the curve of the external temperature of three thermometers 10.1, 10.2 and 10.3 over time. Furthermore, two external temperature reference values 38 are plotted in FIG. 4.

For the thermometer 10.1, FIG. 4 shows that it undergoes a change in the measured external temperature of approx. 20° C. to over 80° C. In this case, the external temperature of the thermometer 10.1 exceeds the upper external temperature reference value 38. By ascertaining this change in the external temperature of the thermometer 10.1, the control unit 30 can ascertain that this same thermometer is used as the "inserted thermometer" together with a food. Tests have demonstrated that an increase in the external temperature in a range of 0.5K-2K per second takes place, meaning that a rapid and thus user-friendly assignment is possible.

FIG. 4 purely schematically shows the ascertained switch states S1 and S2 of the door switch 36. Accordingly, on the basis of S1 and S2 it can be ascertained that the door of the pre-heated cooking appliance is first opened and then closed again. This information can be used for the assignment or for verification of an assignment.

A similar process is shown in FIG. 4 purely by way of example for the thermometer 10.3. Here, the use of the thermometer 10.3 as the inserted thermometer takes place in conjunction with the transfer of the food 100 from the kitchen 50.2 to a freezer, for example.

FIG. 4 purely schematically shows the ascertained switch states S3 and S4 of the door switch 36. Accordingly, on the basis of S3 and S4 it can be ascertained that the door of the freezer is first opened and then closed again. This information can be used for the assignment or for verification of an assignment.

FIG. 4 thus shows that a thermometer assignment can be made by simply using external temperature reference values 38.

Figure 5:
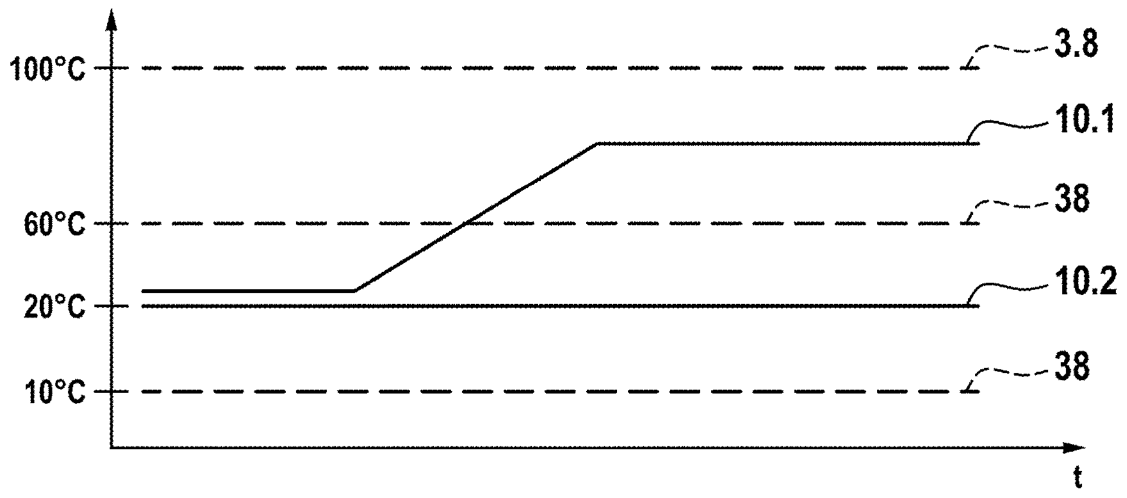

FIG. 5 shows that a receiving space assignment can be made on the basis of the measured external temperature at the same time as or separately from the thermometer assignment. In FIG. 5, three external temperature reference values 38 are plotted, for example at 10° C., 60° C. and 100° C. In the example shown, the external temperature of the thermometer 10.1, which is shown purely schematically and in a highly simplified manner, increases above the 60° C. external temperature reference value, but remains below the 100° C. external temperature reference value.

The 60° C. external temperature reference value can be assigned to the warming chamber 50.2 (see FIG. 3), for example, while the 100° C. external temperature reference value can be assigned to the cooking chamber 50.3 (see FIG. 3). When observing the change in the measured external temperature of the thermometer 10.1, as shown in FIG. 5, it can be concluded by means of the control unit that this thermometer, namely 10.1, is used, and that this thermometer has been transferred into the warming chamber 50.4.

It goes without saying that, as explained in the general part of the description, the reference values can be adjusted to the temperatures of the receiving spaces 50. Furthermore, it goes without saying that, instead of the curves for the external temperature as shown in FIGS. 4 and 5, rates of change in the measured external temperatures can also be consulted. For example, the increase in the relevant measured external temperature would indicate a rate of change of this kind which is to be compared with corresponding rate of change reference values, as explained in the general part of the description.

Figure 6:
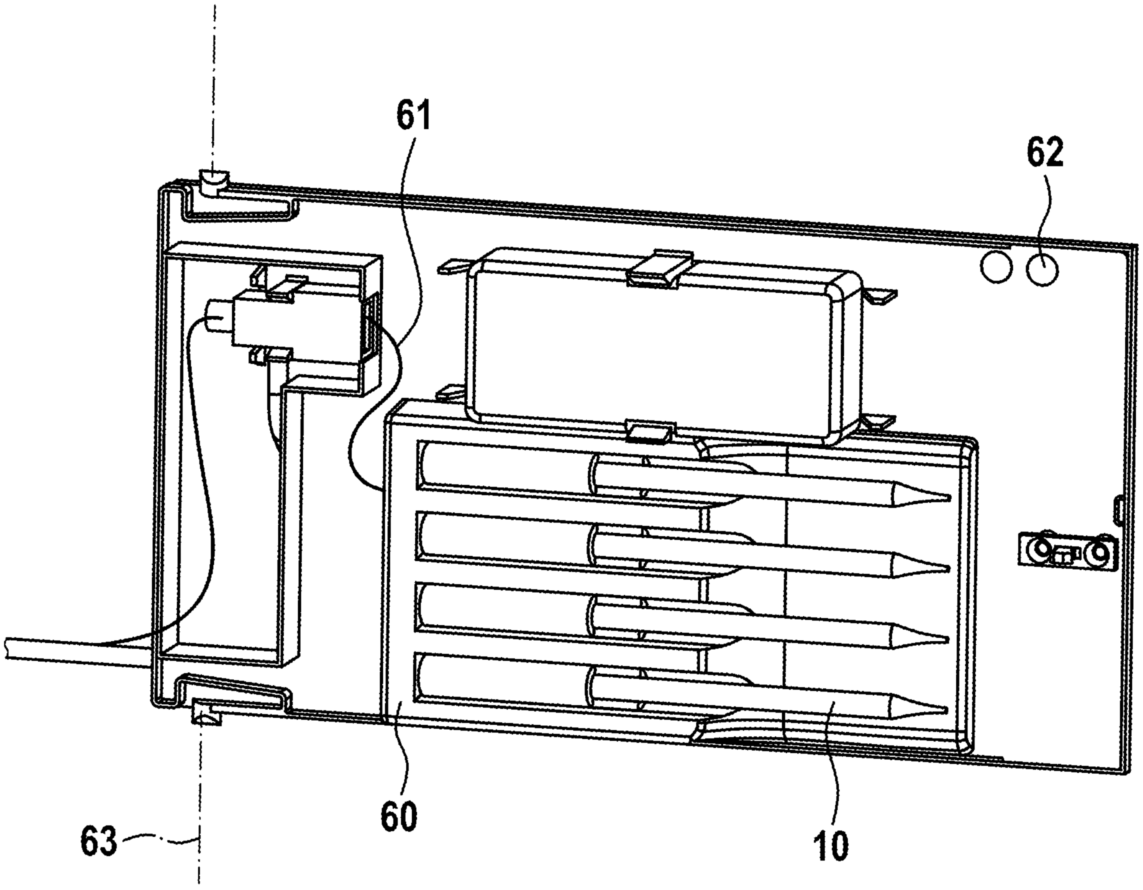
FIG. 6 shows a receptacle for charging thermometers of a food-receiving appliance according to the invention in accordance with an exemplary embodiment.

FIG. 6 shows that the food-receiving appliance 35, as shown in FIG. 1, for example, can comprise an integrated receptacle 60 for inserting at least one of the thermometers 10. In this case, the receptacle 60 is configured to charge a power storage unit of the at least one thermometer 10. As shown, the receptacle 60 is configured for inserting and simultaneously charging a plurality of thermometers 10.

The food-receiving appliance 35 preferably comprises a power supply assembly (not shown) comprising at least one power supply. The power supply assembly supplies power to at least one device of the food-receiving appliance 35, which is used to heat or cool the food 100. The receptacle 60 is connected to the power supply assembly by means of a schematically shown cable connection 61 in order to be supplied with the required power for charging the thermometers 10.

FIG. 6 shows that the food-receiving appliance 35 comprises a cover 62, configured as a pivotable flap having a pivot axis 63, wherein the receptacle 60 is arranged on the inside of the cover 62. The cover 62 can close a chamber in the housing of the food-receiving appliance 35.

In addition to the above written description of the invention, in order to provide supplementary disclosure reference is hereby explicitly made to the drawings of the invention in the figures.

What is claimed is:

1. A method for handling foods, comprising:

providing a plurality of thermometers, each comprising an identifier that is specific to the thermometer, wherein a relevant thermometer comprises at least one core temperature sensor and one external temperature sensor;

providing at least one food in which one of the thermometers is inserted, referred to as the inserted thermometer, wherein the core temperature sensor of the inserted thermometer is arranged to be further inside the food than the external temperature sensor;

continuously measuring an external temperature using the external temperature sensor of the plurality of thermometers;

continuously wirelessly transmitting the external temperature together with the identifier of the relevant thermometer to a control unit;

transferring the food together with the inserted thermometer from a first receiving space having a first receiving space temperature into a second receiving space having a second receiving space temperature, wherein the two receiving space temperatures differ from one another;

assigning a thermometer assignment, by means of the control unit, corresponding to which of the plurality of thermometers has been transferred as the inserted thermometer together with the food based on the measured external temperature of the plurality of thermometers;

assigning a first receiving space assignment, by means of the control unit, corresponding to which receiving space the inserted thermometer has been transferred into together with the food based on the measured external temperature of the inserted thermometer; and/or assigning a second receiving space assignment, by means of the control unit, corresponding to which receiving space the inserted thermometer has been transferred into together with the food by detecting a signal strength of a wireless transmission of the external temperature together with the identifier of the inserted thermometer to the control unit.

2. The method of claim 1, comprising at least one of:

assigning a second receiving space assignment, by means of the control unit, corresponding to which receiving space the inserted thermometer has been transferred into together with the food by:

ascertaining an actuation of a door of the second receiving space, and/or detecting the food and/or the inserted thermometer by means of a camera in a transition region between the first receiving space and the second receiving space.

3. The method of claim 2, wherein more than two receiving spaces for the assignment of the inserted thermometer are available for selection.

4. The method of claim 2, wherein the thermometer assignment and/or the first receiving space assignment are based on:

the measured external temperature of the thermometers in comparison with at least one external temperature reference value, and/or a rate of change of the measured external temperature of the thermometers in comparison with at least one rate of change reference value.

5. The method of claim 4, wherein the at least one external temperature reference value is stored in the control unit as a fixed value, or is adjusted by the control unit based on at least one of the receiving space temperatures; and/or wherein the at least one rate of change reference value is stored in the control unit as a fixed value or wherein the at least one rate of change reference value is adjusted by the control unit based on at least one of the receiving space temperatures.

6. The method of claim 2, wherein the thermometer assignment and/or the receiving space assignment is/are started when at least one of the following start conditions is satisfied:

ascertaining an actuation of a door of one of the receiving spaces, detecting the food and/or the inserted thermometer by means of a camera in the transition region between the first receiving space and the second receiving space, ascertaining a temperature difference between the core temperature measured by the core temperature sensor and the external temperature at one of the thermometers, and a user input which forms the second receiving space.

7. The method of claim 2, wherein:

the thermometer assignment is displayed to a user, and can be confirmed and/or modified by the user, the receiving space assignment is displayed to a user, and can be confirmed and/or modified by the user.

8. The method of claim 2, wherein a core temperature is continuously measured using the core temperature sensor of the inserted thermometer and the core temperature together with the identifier is continuously wirelessly transmitted to the control unit.

9. The method of claim 8, wherein:

the core temperature and the associated receiving space are displayed, and/or the core temperature is displayed on a display of a food-receiving appliance which forms the second receiving space, and/or the temperature of the first receiving space and/or the second receiving space is controlled based on the core temperature, and/or a dwell time of the food in the second receiving space is determined, and displayed, based on the core temperature, and/or a warning is output based on the core temperature if the food is transferred at a core temperature that is too low.

10. The method of claim 2, wherein the timing of the thermometer assignment and/or the receiving space assignment, is logged by means of the control unit for monitoring a quality of the food.

11. An assembly for handling foods, the assembly comprising:

a plurality of thermometers, each comprising an identifier that is specific to the thermometer, wherein a relevant thermometer comprises at least one core temperature sensor and one external temperature sensor, wherein:

the thermometers are configured to be inserted into a food such that the core temperature sensor of the inserted thermometer can be arranged to be further inside the food than the external temperature sensor, the thermometers are configured to continuously measure an external temperature using the external temperature sensor, and the thermometers are configured to continuously wirelessly transmit the external temperature together with the identifier of the relevant thermometer; and a control unit configured to:

assign which thermometer has been transferred as the inserted thermometer together with a food on the basis of the measured external temperature of the thermometers when transferring the food together with the inserted thermometer from a first receiving space having a first receiving space temperature into a second receiving space having a second receiving space temperature, wherein the two receiving space temperatures differ from one another, and assign a first receiving space assignment, by means of the control unit, corresponding to which receiving space the inserted thermometer has been transferred into together with the food based on the measured external temperature of the inserted thermometer, and/or assign a second receiving space assignment, by means of the control unit, corresponding to which receiving space the inserted thermometer has been transferred into together with the food by detecting a signal strength of a wireless transmission of the external temperature together with the identifier of the inserted thermometer to the control unit.

12. The assembly of claim 11, wherein the control unit comprises:

at least one receiving module, wherein the thermometers and the receiving module are configured for wireless data transmission, and/or at least one computing module, which is configured to carry out the assignment(s), and/or at least one human-machine interface, and/or at least one food-receiving appliance which forms one of the receiving spaces.

13. The assembly of claim 12, wherein the at least one receiving module is integrated in the food-receiving appliance, and/or wherein the at least one receiving module is connected to a network, wherein the at least one receiving module is interconnected to at least one additional receiving module such that the thermometers of the respective receiving modules can transmit to one another.

14. The assembly of claim 12, wherein the computing module is integrated in the food-receiving appliance, and/or wherein the computing module is connected to a network.

15. The assembly of claim 12, comprising at least two receiving modules, one arranged for receiving inside the food-receiving appliance and one arranged for receiving outside the food-receiving appliance.

* * * * *